May 12, 1931. J. L. DRAKE 1,805,237
SHEET MOLDING APPARATUS
Filed Feb. 8, 1926
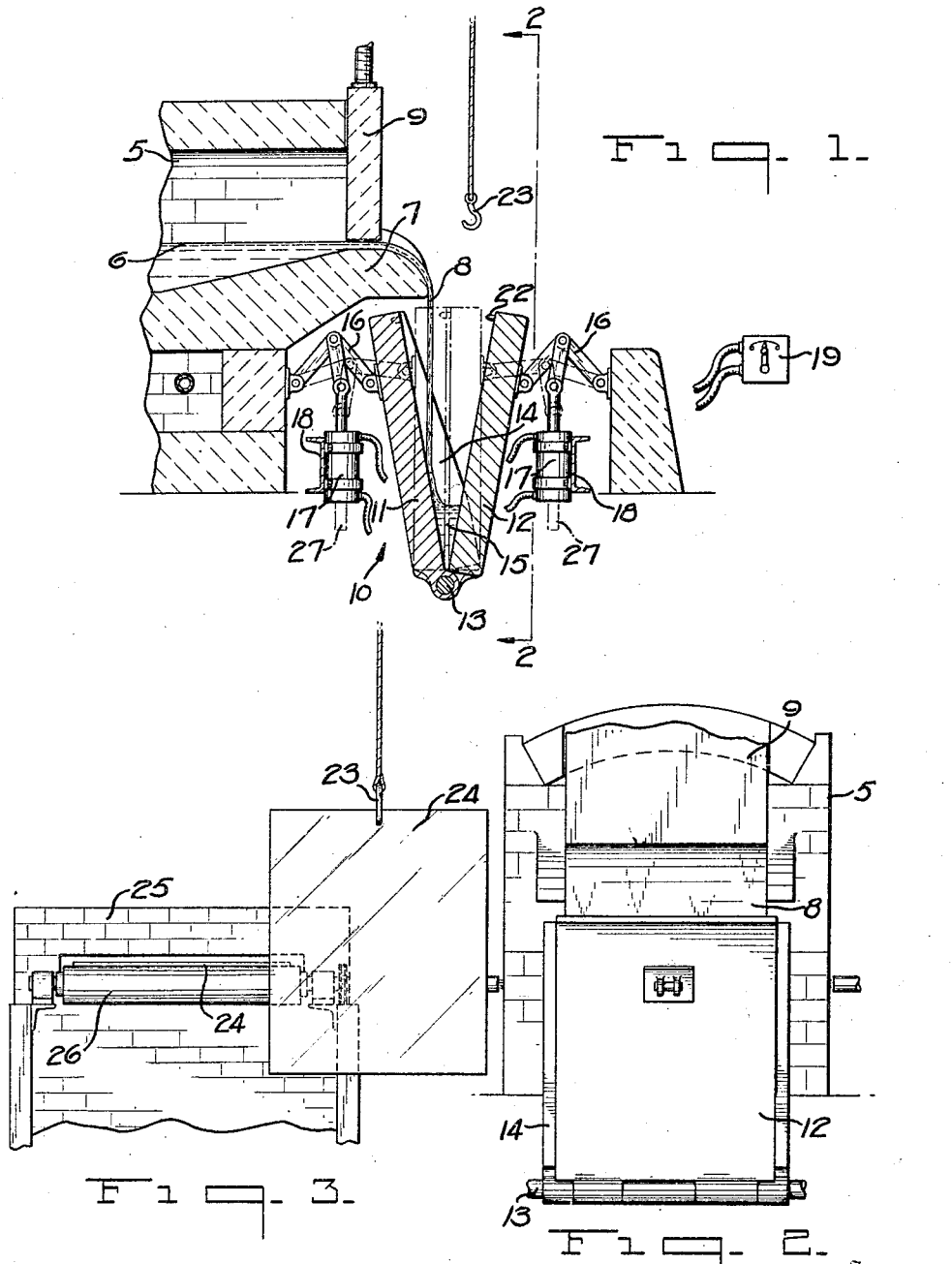
Inventor
John L. Drake.
By Frank Fraser
Attorney Patented May 12, 1931

1,805,237

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

SHEET MOLDING APPARATUS

Application filed February 3, 1926. Serial No. 86,735.

The present invention relates to sheet glass apparatus, and has particular reference to the formation of a sheet of glass, particularly well adapted for use as a plate glass blank.

An important object of the invention is to provide apparatus wherein a quantity of glass may be flowed between a pair of hingedly associated plates which are movable toward each other to reduce the molten glass to sheet form.

Another object of the invention is to provide means whereby a predetermined quantity of glass may be flowed from a suitable source of supply, the glass being received between a pair of hingedly connected plates which may be operated to reduce the molten glass to sheet form.

A further object of the invention is to provide a device of this nature wherein a pair of plates are arranged in a substantially vertical plane and being pivotally connected at their lower ends, said apparatus including means whereby a quantity of molten glass may be flowed between the said plates, said plates having associated therewith mechanism for moving the plates about their pivotal connection to reduce the molten glass to sheet form, after which the sheet may be removed and properly annealed.

Other objects and advantages of the invention will become apparent during the course of the following description.

In the drawings wherein like numerals are employed to designate like parts throughout the same, Fig. 1 is a fragmentary vertical longitudinal section through my improved construction, Fig. 2 is a section taken on line 2—2 in Fig. 1, and looking in the direction of the arrow, and Fig. 3 is an end view of a form of annealing leer which may be used.

The construction set forth in the drawings is particularly well adapted for the production of plate glass blanks. The most important thing to be considered in the formation of such blanks is the question of uniform thickness. As the blanks are ground and polished it is not essential that the blank as originally formed be transparent. With my improved construction it is possible to quickly form a blank suitable for plate glass use of uniform thickness, while at the same time it is perfectly flat and smooth. By forming the blank flat, smooth and of uniform thickness, the allowance ordinarily made for removal during the surfacing operations can be reduced to a minimum.

In the drawings, the numeral 5 designates a tank furnace which contains a mass of molten glass 6. Disposed at one end of the furnace 5 is a lip 7 over which the glass may flow in a thin stream 8. An adjustable shear cake 9 may be used to control the flow of glass over the lip.

Arranged beneath the lip 7 is a mold 10, comprising a pair of preferably heat resisting metallic plates 11 and 12 which are pivotally associated at the lower end as by means 13. Side boards 14 may be carried by one of the plates to prevent loss of the molten charge 15 which is disposed between the said metal plates.

Each of the plates may have associated therewith a link mechanism 16 which may be connected to an air cylinder 17 mounted upon the rails 18. The air cylinder, which has a piston arranged therein, may be controlled as by a suitable switch 19. The switch may be moved in one direction to move the plates 11 and 12 into operative position, and in the opposite direction to move the plates into an inoperative position.

A pin 22 may be carried by one of the mold sections to form an opening in the sheet being formed so that a suitable hook or other form of handling means 23 can be engaged therein to remove the sheet after it has been formed.

In Fig. 3, the sheet 24 is shown as being moved from the mold over to an annealing leer 25. The sheet is placed upon a conveyor 26, after which it is conveyed through the leer 25 to properly anneal the same. After the sheet has been annealed it may then be ground and polished as is well understood in the art.

In operation, the tank furnace 5 is normally operated to produce the molten glass 6. The shear cake 9, which, as shown is purely diagrammatic, is used to control the overflow of glass over the lip. To begin the operation, the plates 11 and 12 are placed in an inoperative or open position. The glass is permitted to flow until a predetermined charge of glass is deposited between the said mold sections, after which the control gate 9 is operated to shut off the flow of glass. The switch 19 is then operated which causes the air cylinder to move the plunger 27 downwardly, extending the link connection 16, and moving the plates 11 and 12 toward each other to reduce the charge of molten glass 15 to sheet form. The switch 19 is then reversed, whereupon the mold sections 11 and 12 will be opened and the sheet may then be removed by means of the handling mechanism 23. The sheet is then permitted to be passed through the annealing leer, after which it may be ground and polished.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass apparatus, a mold comprising a pair of approximately vertical mold plates pivotally associated with one another and normally positioned in upwardly diverging relation to create a mold cavity therebetween for receiving therein a quantity of molten glass, and means for moving said plates toward one another to reduce the molten glass therebetween to sheet form, including a link mechanism associated with each plate, and separate operating means for each link mechanism.

2. In sheet glass apparatus, a mold comprising a pair of mold plates pivotally associated at one end, said mold plates being arranged in a substantially vertical plane, and an air controlled link mechanism associated with each mold plate whereby said plates may be moved about their pivotal connection to reduce the molten glass therebetween to sheet form.

3. In sheet glass apparatus, a mold comprising a pair of pivotally associated mold plates arranged in normally upwardly diverging relation to create a mold cavity therebetween for receiving a quantity of molten glass, means for actuating the plates to reduce the molten glass therebetween to sheet form, and means for simultaneously forming an opening in the sheet adjacent one end thereof.

4. In sheet glass apparatus, a mold comprising a pair of pivotally associated mold plates arranged in normally upwardly diverging relation to create a mold cavity therebetween for receiving a quantity of molten glass, means for actuating the plates to reduce the molten glass therebetween to sheet form, and a pin carried by one mold plate and receivable within a recess in the other mold plate for forming an opening in the sheet adjacent one end thereof to facilitate its subsequent removal from said mold.

Signed at Toledo, in the county of Lucas, and State of Ohio, this 4th day of February, 1926.

JOHN L. DRAKE.